(12) United States Patent
Zhou

(10) Patent No.: US 8,808,520 B2
(45) Date of Patent: Aug. 19, 2014

(54) VERTICAL SLICE GEL ELECTROPHORESIS CELL

(76) Inventor: Deming Zhou, Allen, TX (US)

(*) Notice: Subject to any disclaimer, the term of this patent is extended or adjusted under 35 U.S.C. 154(b) by 167 days.

(21) Appl. No.: 13/385,020

(22) Filed: Jan. 30, 2012

(65) Prior Publication Data
US 2012/0205247 A1 Aug. 16, 2012

Related U.S. Application Data

(60) Provisional application No. 61/463,281, filed on Feb. 15, 2011.

(51) Int. Cl.
*G01N 27/453* (2006.01)

(52) U.S. Cl.
USPC .......................................... 204/618

(58) Field of Classification Search
USPC .................................................. 204/467, 618
See application file for complete search history.

(56) References Cited

U.S. PATENT DOCUMENTS 6,942,775 B1* 9/2005 Fox ............................... 204/467
2004/0195103 A1* 10/2004 Zhou ............................ 204/467

* cited by examiner

*Primary Examiner* — Alex Noguerola

(57) ABSTRACT

In the present innovated vertical slice gel electrophoresis cell, at least one piece of large diameter screw urging ring is held to face to one U-shaped side opening of an upper buffer chamber, but an interval is left therebetween. After inserting a gel cassette into the interval, turning tight the screw urging ring can force at least one piece of gel cassette to join the upper buffer chamber tightly, no matter how thick the cassette is. In addition, some other materials are found also suitable for absorbing the Joule-heat after sealing them into dielectric shells respectively.

4 Claims, 2 Drawing Sheets

VERTICAL SLICE GEL ELECTROPHORESIS CELL

REFERENCE TO RELATED APPLICATIONS

This application claims the benefit of provisional application 61/463,281, filed on Feb. 15, 2011.

FIELD OF THE INVENTION

This invention relates to electrophoresis device, and specifically to an electrophoresis cell for causing charged granules migration vertically within upright stood slice shaped gel matrix.

PRIOR ART AND THE COMMENT

The phenomenon of charged granules migration in an electric field is termed electrophoresis. As a technique, electrophoresis is extensively applicable for separation of bio-macromolecules in gel matrix. That is because the network of the gel matrix can act as a molecular sieve to retard the migration of different macromolecular species mainly according to their size. In addition, the gel matrix can stabilize the boundaries of the separated molecular species both during and after the electrophoresis running, so that to facilitate the afterward analyses. Horizontal slab gel electrophoresis typically uses agarouse gel for separation of DNA or RNA, while vertical slice gel electrophoresis (abbreviated as VSG electrophoresis, or electrophoresis hereafter) mainly utilizes polyacrylamide gel for separation of protein species nowadays. It had better to cast the polyacrylamide gel into a relativity closed rigid envelope, which is usually called a vertical slice gel cassette (abbreviated as VSG cassette, gel cassette, or cassette hereafter). That is because oxygen inhibits monomer acrylamide from forming polyacrylamide gel, and a vertically stood cassette has minimum surface exposing to air.

There are several difficult points relating to the design of a VSGE cell. They are: how to construct a vertical slice gel cassette; how to insure there is no leakage when gel is casting into the cassettes; how to design a tightening mechanism for forcing cassettes to join an upper buffer chamber (abbreviated as UBC hereafter); and how to absorb the Joule heat during electrophoresis running.

In U.S. Pat. No. 3,719,580 to Roberts et al (1973) and U.S. Pat. No. 3,932,265 to Hoefer (1976), most of those difficult points as mentioned above had been solved by their ways. However, there were no demountable gel cassettes in those 2 earlier electrophoresis devices, resulted in no any pre-cast gels (which are commercially available nowadays) can use in them. In U.S. Pat. No. 5,632,877 to Atta (1997) and U.S. Pat. No. 6,001,233 to Levy (1999), the inventors mainly improved the tightening mechanisms. As a result, with just a couple of manipulating steps can force two pieces of their own gel cassettes to join their UBC properly, but any other brand gel cassette can hardly to use in their apparatus. That is because on one hand, their tightening mechanisms are short of interval adjustability, (plus there is a stair on the UBC/cassette interface in Atta's device); and on the other hand, those so called mini gel cassettes from the market have varied thickness differences that is from 3 mm to 7 mm. But fortunately the profiles of all mini gel cassettes are established by the popular usages, which is from 100 mm (w)×85 mm (h) to 4 inch×4 inch (equal to 101.6×101.6 mm). In U.S. Pat. No. 7,749,367 to Zhou (2010), the inventor puts forward several new structural tactics for constructing the VSG cassettes, he utilized a simple device for absorbing the Joule heat, and he disclosed several extremely simple but rather reliable tools and methods to insure leaking-free gel casting. But, his improved tightening mechanism only has limited interval adjustability, which is not good enough to deal with all of those thicknesses different cassettes from the market.

So, the current subject matter in this field is to develop out a new vertical slice gel electrophoresis device that should have a 102 mm×102 mm UBC/cassette interface plus a tightening mechanism having at least 8 mm continuously interval adjustability.

SUMMARY OF THE INVENTION

In the present innovated vertical slice gel electrophoresis cell, at least one piece of large diameter screw urging ring is held to face to one U-shaped side opening of an upper buffer chamber, but an interval is left therebetween. After inserting a gel cassette into the interval, turning tight the screw urging ring can force at least one piece of gel cassette to join the upper buffer chamber tightly no matter how thick the cassette is. In addition, some other materials are found also suitable for absorbing the Joule-heat after sealing them into dielectric shells respectively.

DETAILED DESCRIPTION OF THE PREFERRED EMBODIMENTS

Figure 1:
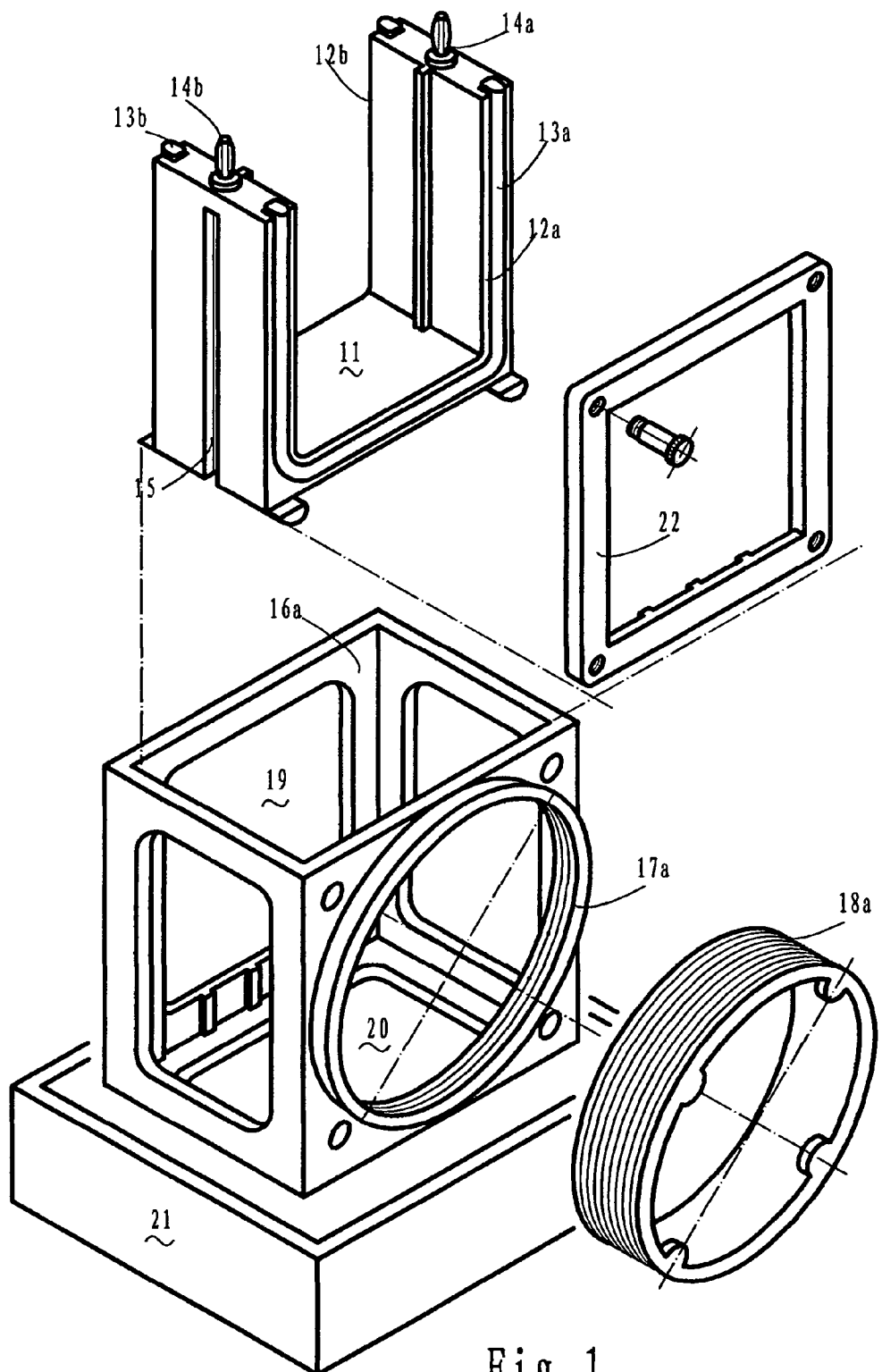
FIG. 1 is an exploded perspective view of the first embodiment of the present innovated vertical slice gel electrophoresis cell.

FIG. 1 is an exploded perspective view of the first embodiment of the present innovated vertical slice gel electrophoresis cell. This embodiment is made of plastic except the banana plugs and the U-shaped rubber sealing gaskets. Wherein UBC 11 is for housing a volume of upper pH buffer solution and an upper electrode in it, having base-plate, sidewalls and 2 U-shaped side openings 12a and 12b, each of them is rimmed along with a U-shaped rubber sealing gasket 13a or 13b respectively, so as to enable two pieces of VSG cassettes to join thereat respectively and water tightly. Banana plug 14a is the connecting point of the upper electrode (not showing in this drawing) to a DC power supply. Banana plug 14b is the connecting point of the lower electrode (not showing in this drawing) to the DC power supply. Shallow groove 15 is for burying the electric wire that connects the lower electrode to banana plug 14b. Jacket box 16a has base-plate and 4 sidewalls, is for housing the UBC 11 plus two pieces of vertical slice gel cassettes in it. Large diameter threaded window 17a is opened on one sidewall of jacket box 16a, and there is a large diameter screw urging ring 18a held in the threaded window 17a (we have ways to prevent urging ring 18a from demounting from jacket box 16a). After set UBC 11 down into jacket box 16a, result in the screw urging ring 18a facing to a U-shaped side opening 12 of UBC 11. A method to manipulate this embodiment is to put 2 pieces of vertical slice gel cassettes beside UBC 11 by facing the U-notched upper openings of the cassettes to the 2 U-shaped side openings of UBC 11 respectively; and then to lower 3 of them together down into jacket box 16a. Thereafter turning tight screw urging ring 18a can force the 2 cassettes to join the UBC 11 tightly, no matter how thick the cassettes are. A sheet of U-shaped or square shaped rigid frame as the 22 can be interjected between screw urging ring 18a and the nearest VSG cassette when the cassette itself is not rigidity enough. Jacket box 16a can have other functional windows, such as window 19 enables to watch the electrophoresis running, window 20 allows communicating with the lower buffer chamber 21. Lower buffer chamber 21 is a plastic container having base-plate and sidewalls, functionally for housing a volume of lower pH buffer solution, a lower electrode and the lower openings of the engaged VSG cassettes.

Figure 2:
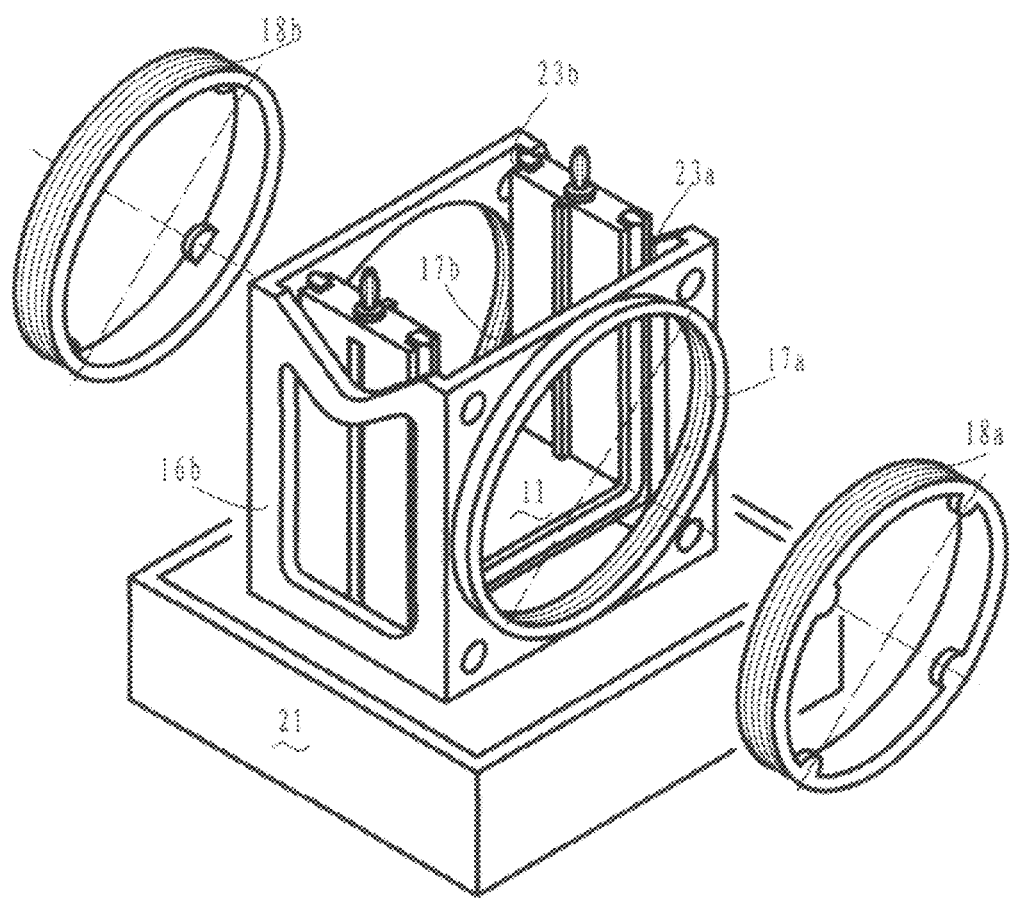
FIG. 2 is an exploded perspective view of the second embodiment of the present innovated vertical slice gel electrophoresis cell.

FIG. 2 is an exploded perspective view of the second embodiment of the present innovated vertical slice gel electrophoresis cell. Here the UBC 11 is the same UBC 11 as in FIG. 1. But in this second embodiment, UBC 11 is fixed in jacket box 16b. Jacket box 16b has two large diameter threaded windows 17a and 17b opposite to each other. Each of them holds a large diameter screw urging ring 18b our 18c in it respectively. After fixing UBC 11 in jacket box 16b, result in screw urging ring 18b and 18c facing to the 2 U-shaped side openings 12a and 12b respectively. But intervals 23a and 23b are left therebetween. After inserting two pieces of VSG cassettes into intervals 23a and 23b respectively, turning tight screw urging rings 18b and 18c can force the 2 pieces of vertical slice gel cassettes to join UBC11 tightly.

In addition, some other materials are found also suitable for using to absorb the Joule heat after sealing them into dielectric shells respectively. Said materials include acetic acid, automobile antifreeze coolant, water and water containing foreign substances. Those shell wrapped materials must be pre-cooled somewhere before putting into the UBC of a VSG electrophoresis cell for absorbing the Joule heat during electrophoresis running.

What is claimed is:

1. A vertical slice gel electrophoresis cell for causing charged granules to migrate vertically within an upright slice shaped gel matrix, said electrophoresis cell comprising:
    (a) an upper buffer chamber for housing a volume of pH buffer solution and an upper electrode said upper buffer chamber having a base-plate, sidewalls and two opposite U-shaped side openings with a U-shaped rubber sealing gasket rimmed along each U-shaped side opening so as to enable a vertical slice gel cassette to join said upper buffer chamber at one of said U-shaped side opening in a water tight manner;
    (b) a vertical slice gel cassette for said gel matrix to be cast in and said electrophoresis to be performed in it, said vertical slice gel cassette having two spacer-spaced side walls, closed left and right margins, a lower opening, and a U-notched upper opening open to one face of said gel cassette;
    (c) a tightening mechanism for forcing said vertical slice gel cassette to join said upper buffer chamber at one of said U-shaped side openings;
    (d) a lower buffer chamber having a base-plate and sidewalls, for housing a volume of pH buffer solution, a lower electrode and the lower opening of said vertical slice gel cassette; and
    (e) a heat absorbing device for absorbing the Joule-heat during running of said electrophoresis;
        wherein said tightening mechanism comprises at least one piece of a large diameter screw urging ring to be held to face to one U-shaped side opening of said upper buffer chamber at an interval from said U-shaped side opening, into which interval said vertical slice gel cassette may be installed in, the tightening mechanism configured so it is able to force at least one piece of said vertical slice gel cassette to join said upper buffer chamber tightly, as long as said screw urging ring is turning in a tightening direction.

2. The electrophoresis cell in accordance with claim 1, wherein said a large diameter screw urging ring is held by a large diameter threaded window opened on a sidewall of a jacket box that has a base-plate and four sidewalls, after said upper buffer chamber has been installed into said jacket box, resulting in said large diameter screw urging ring to face to one U-shaped side openings of said upper buffer chamber and an interval formed in front of each U-shaped side opening of said upper buffer chamber, into each of said interval a vertical slice gel cassettes may be installed therein respectively, the tightening mechanism configured so it is able to force two pieces of said vertical slice gel cassette to join said upper buffer chamber simultaneously and tightly, as long as said screw urging ring is turning in a tightening direction.

3. The electrophoresis cell in accordance with claim 1, further includes a piece of a second large diameter screw urging ring, wherein the two pieces of large diameter screw urging rings are held by two respective large diameter threaded windows opened on two opposite sidewalls of a jacket box that has a base-plate and four sidewalls, after said upper buffer chamber has been installed and fixed into said jacket box, resulting in said two large diameter screw urging rings each facing one of the two U-shaped side openings of said upper buffer chamber respectively and with an interval left between each large diameter screw urging ring and the respective U-shaped side opening of said upper buffer chamber, wherein into each of said interval a vertical slice gel cassette may be installed the tightening mechanism configured so it is able to force two pieces of said vertical slice gel cassette to join said upper buffer chamber tightly, as long as said two large diameter screw urging rings are turning in the tightening direction.

4. The electrophoresis cell in accordance with claim 1, further including a piece of plastic frame that is installed between said large diameter screw urging ring and said vertical slice gel cassette for distributing the pressure from said screw urging ring to said vertical slice gel cassette.

* * * * *